US012665276B2

(12) United States Patent
Yang et al.

(10) Patent No.: US 12,665,276 B2
(45) Date of Patent: Jun. 23, 2026

(54) ADJUSTABLE RADIO FREQUENCY UNIT, FILTER, AND ELECTRONIC DEVICE

(71) Applicants: Beijing BOE Sensor Technology Co., Ltd., Beijing (CN); BOE Technology Group Co., Ltd., Beijing (CN)

(72) Inventors: Yuanlong Yang, Beijing (CN); Chuncheng Che, Beijing (CN); Jing Pang, Beijing (CN); Feng Qu, Beijing (CN); Zhifeng Zhang, Beijing (CN); Sheng Chen, Beijing (CN); Meng Wei, Beijing (CN); Xueyan Su, Beijing (CN); Yunzhang Zhao, Beijing (CN); Liangrong Ge, Beijing (CN); Yuanfu Li, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 516 days.

(21) Appl. No.: 18/023,554

(22) PCT Filed: Jun. 14, 2022

(86) PCT No.: PCT/CN2022/098731
§ 371 (c)(1),
(2) Date: Feb. 27, 2023

(87) PCT Pub. No.: WO2023/240463
PCT Pub. Date: Dec. 21, 2023

(65) Prior Publication Data

US 2024/0275011 A1 Aug. 15, 2024

(51) Int. Cl.
*H01P 1/20* (2006.01)

(52) U.S. Cl.
CPC .................................... *H01P 1/20* (2013.01)

(58) Field of Classification Search
CPC ........................................................ H01P 1/20
See application file for complete search history.

(56) References Cited

U.S. PATENT DOCUMENTS

2007/0109078 A1 5/2007 Kintis et al.
2017/0045759 A1 2/2017 Han et al.
2020/0153076 A1 5/2020 Bulja et al.

FOREIGN PATENT DOCUMENTS

CN 108054517 A 5/2018
CN 108847517 A 11/2018
(Continued)

OTHER PUBLICATIONS

Office Action dated Apr. 15, 2026, issued in counterpart CN Application No. 202280001746.7, with English translation. (18 pages).

*Primary Examiner* — Andrea Lindgren Baltzell
*Assistant Examiner* — Kimberly E Glenn
(74) *Attorney, Agent, or Firm* — WHDA, LLP

(57) ABSTRACT

The present application provides an adjustable radio frequency unit, a filter, and an electronic device. The adjustable radio frequency unit includes a first tunable dielectric layer and a second tunable dielectric layer; a first conductive layer located between the first tunable dielectric layer and the second tunable dielectric layer; a second conductive layer located on the side, away from the first conductive layer, of the first tunable dielectric layer; and a third conductive layer located on the side, away from the first conductive layer, of the second tunable dielectric layer; wherein orthographic projections of the first conductive layer, the second conductive layer and the third conductive layer on the first tunable dielectric layer at least partially overlap with one another. The adjustable radio frequency unit has the characteristic of
(Continued)

passband adjustability and with high adjustment precision, good controllability, wide working frequency range, and low loss and cost.

17 Claims, 6 Drawing Sheets

(56) References Cited

FOREIGN PATENT DOCUMENTS

| | | | | | |
|---|---|---|---|---|---|
| CN | 111193083 | A | | 5/2020 | |
| CN | 113937504 | A | | 1/2022 | |
| CN | 114050385 | A | | 2/2022 | |
| WO | WO-2005043669 | A1 | * | 5/2005 | ............... H10D 1/64 |

* cited by examiner

ADJUSTABLE RADIO FREQUENCY UNIT, FILTER, AND ELECTRONIC DEVICE

FIELD

The present application relates to the technical field of communication, in particular to an adjustable radio frequency unit, a filter, and an electronic device.

BACKGROUND

A band pass filter (BPF) is a component allowing waves in a specific frequency band to pass through while shielding waves in other frequency bands. In the related art, a BPF prepared by adopting a variable-capacitance diode has the advantages of wide frequency tuning range and simple design method. However, under the effect of an inductor packaged with a leading wire, the BPF can only work at a low frequency band, such as an X wave band.

SUMMARY

Embodiments of the present application adopt the following technical solutions.

In a first aspect, an embodiment of the present application provides an adjustable radio frequency unit, including:

- a first tunable dielectric layer and a second tunable dielectric layer;
- a first conductive layer located between the first tunable dielectric layer and the second tunable dielectric layer;
- a second conductive layer located on the side, away from the first conductive layer, of the first tunable dielectric layer; and
- a third conductive layer located on the side, away from the first conductive layer, of the second tunable dielectric layer;
- wherein orthographic projections of the first conductive layer, the second conductive layer and the third conductive layer on the first tunable dielectric layer at least partially overlap with one another.

In some embodiments of the present application, the orthographic projections of the first conductive layer, the second conductive layer and the third conductive layer on the first tunable dielectric layer are all located in an orthographic projection of the second tunable dielectric layer on the first tunable dielectric layer; and

- orthographic projections of the first conductive layer, the second conductive layer and the third conductive layer on the second tunable dielectric layer are all located in an orthographic projection of the first tunable dielectric layer on the second tunable dielectric layer.

In some embodiments of the present application, each of the first tunable dielectric layer and the second tunable dielectric layer includes a first substrate, a second substrate, and tunable dielectric parts and fixed dielectric parts which are located between the first substrate and the second substrate; and the tunable dielectric parts are located between two adjacent fixed dielectric parts; and

- orthographic projections of the tunable dielectric parts in the first tunable dielectric layer on the first substrate overlap with orthographic projections of the tunable dielectric parts in the second tunable dielectric layer on the first substrate.

In some embodiments of the present application, one of the first substrate and the second substrate forms an integrated structure with the fixed dielectric parts.

In some embodiments of the present application, orthographic projections of the first conductive layer, the second conductive layer and the third conductive layer on the first substrate partially overlap with the orthographic projections of the tunable dielectric parts on the first substrate, respectively; and the orthographic projections of the first conductive layer, the second conductive layer and the third conductive layer on the first substrate partially overlap with orthographic projections of the fixed dielectric parts on the first substrate, respectively.

In some embodiments of the present application, an area of a region where the orthographic projections of the first conductive layer, the second conductive layer and the third conductive layer on the first substrate respectively overlap with the orthographic projections of the tunable dielectric parts on the first substrate is greater than an area of a region where the orthographic projections of the first conductive layer, the second conductive layer and the third conductive layer on the first substrate respectively overlap with the orthographic projections of the fixed dielectric parts on the first substrate.

In some embodiments of the present application, sizes of the tunable dielectric parts of the first tunable dielectric layer in a direction perpendicular to a plane where the first substrate is located are equal to sizes of the tunable dielectric parts of the second tunable dielectric layer in the direction perpendicular to the plane where the first substrate is located; and

- sizes of the fixed dielectric parts of the first tunable dielectric layer in the direction perpendicular to the plane where the first substrate is located are equal to sizes of the fixed dielectric parts of the second tunable dielectric layer in the direction perpendicular to the plane where the first substrate is located.

In some embodiments of the present application, the orthographic projection of the second conductive layer on the first substrate overlaps with the orthographic projection of the third conductive layer on the first substrate, and the orthographic projection of the second conductive layer on the first substrate is located in the orthographic projection of the first conductive layer on the first substrate.

In some embodiments of the present application, a difference value of a conductivity of a material of the second conductive layer and a conductivity of a material of the third conductive layer is less than or equal to a preset value.

In some embodiments of the present application, the orthographic projections of the tunable dielectric parts on the first substrate are located in the orthographic projection of the first conductive layer on the first substrate, and patterns of the orthographic projections of the tunable dielectric parts on the first substrate have the same shape with a pattern of the orthographic projection of the first conductive layer on the first substrate; and the patterns of the orthographic projections of the tunable dielectric parts on the first substrate are of polygons, arcs or combinations of the polygons and the arcs.

In some embodiments of the present application, each of the first tunable dielectric layer and the second tunable dielectric layer further includes a connecting part located between the first substrate and the second substrate and configured to fixedly connect the tunable dielectric parts and the fixed dielectric parts.

In some embodiments of the present application, a difference value of a dielectric constant of each of a material of the first substrate, a material of the second substrate and a material of the connecting part and a dielectric constant of a material of each of the fixed dielectric parts is less than or equal to a preset value.

In some embodiments of the present application, each of the second conductive layer and the third conductive layer includes a plurality of conductive parts arranged in a first direction and electrically connected together; and the first direction is a clockwise direction or a counter-clockwise direction.

In some embodiments of the present application, the plurality of conductive parts of the second conductive layer are symmetrically arranged with a geometric center of the second conductive layer as a symmetric point; and the geometric center of the second conductive layer is located on a position where the plurality of conductive parts of the second conductive layer are connected; and a structure of the third conductive layer is the same as a structure of the second conductive layer.

In some embodiments of the present application, each of the conductive parts includes a plurality of bent structures connected in sequence; and each of the bent structures includes a first line segment, a second line segment, a third line segment and a fourth line segment connected in sequence, a first included angle is formed between an extension direction of the first line segment and an extension direction of the second line segment, a second included angle is formed between the extension direction of the second line segment and an extension direction of the third line segment, and a third included angle is formed between the extension direction of the third line segment and an extension direction of the fourth line segment; and the first included angle, the second included angle and the third included angle are all greater than 0° and are less than 180".

In some embodiments of the present application, the first included angle, the second included angle and the third included angle are all right angles.

In some embodiments of the present application, the adjustable radio frequency unit further includes a first bonding layer, a second bonding layer, a third bonding layer and a fourth bonding layer; the first bonding layer is located between the first conductive layer and the first tunable dielectric layer, the second bonding layer is located between the first conductive layer and the second tunable dielectric layer, the third bonding layer is located between the second conductive layer and the first tunable dielectric layer, and the fourth bonding layer is located between the third conductive layer and the second tunable dielectric layer; and a difference value of a dielectric constant of a material of each of the first bonding layer, the second bonding layer, the third bonding layer and the fourth bonding layer and a dielectric constant of a material of each of the fixed dielectric parts is less than or equal to a preset value.

In some embodiments of the present application, the adjustable radio frequency unit further includes a first protective layer and a second protective layer, the first protective layer is located on the side, away from the first tunable dielectric layer, of the second conductive layer, and the second protective layer is located on the side, away from the second tunable dielectric layer, of the third conductive layer.

In some embodiments of the present application, materials of the tunable dielectric parts include at least one liquid crystal.

In a second aspect, an embodiment of the present application provides a filter, including a plurality of adjustable radio frequency units mentioned above, the plurality of adjustable radio frequency units being arranged in an array.

In some embodiments of the present application, the second conductive layer of each of the adjustable radio frequency units is disconnected, and the third conductive layer of each of the adjustable radio frequency units is disconnected; and the tunable dielectric parts, located on the first tunable dielectric layers, in the plurality of adjustable radio frequency units communicate, and the tunable dielectric parts, located on the second tunable dielectric layers, in the plurality of adjustable radio frequency units communicate.

In some embodiments of the present application, the filter further includes a driving unit electrically connected to the adjustable radio frequency units; and the driving unit is configured to be capable of driving each of the adjustable radio frequency units to independently work.

In some embodiments of the present application, the driving unit includes a first driving subunit, a second driving subunit and a grounding wire;

the first driving subunit is located on the side, away from the first tunable dielectric layer, of the second conductive layer and is electrically connected to the second conductive layer; and the second driving subunit is located on the side, away from the second tunable dielectric layer, of the third conductive layer and is electrically connected to the third conductive layer, and the first conductive layer of each of the adjustable radio frequency units is electrically connected to the grounding wire.

In a third aspect, an embodiment of the present application provides an electronic device including the filter mentioned above.

The above description is only an overview of the technical solution of the present application. In order to better understand the technical means of the present application, it can be implemented according to the contents of the specification, and in order to make the above and other purposes, features and advantages of the present application more obvious and understandable, the specific implementation methods of the present application are listed below.

BRIEF DESCRIPTION OF THE DRAWINGS

In order to more clearly explain the embodiments of the present application or the technical solutions in related art, the following will briefly introduce the drawings that need to be used in the embodiments or the description of the prior art. It is obvious that the drawings in the following description are only some embodiments of the present application. For ordinary technicians in the art, other drawings can also be obtained from these drawings without any creative work.

Figure 1:
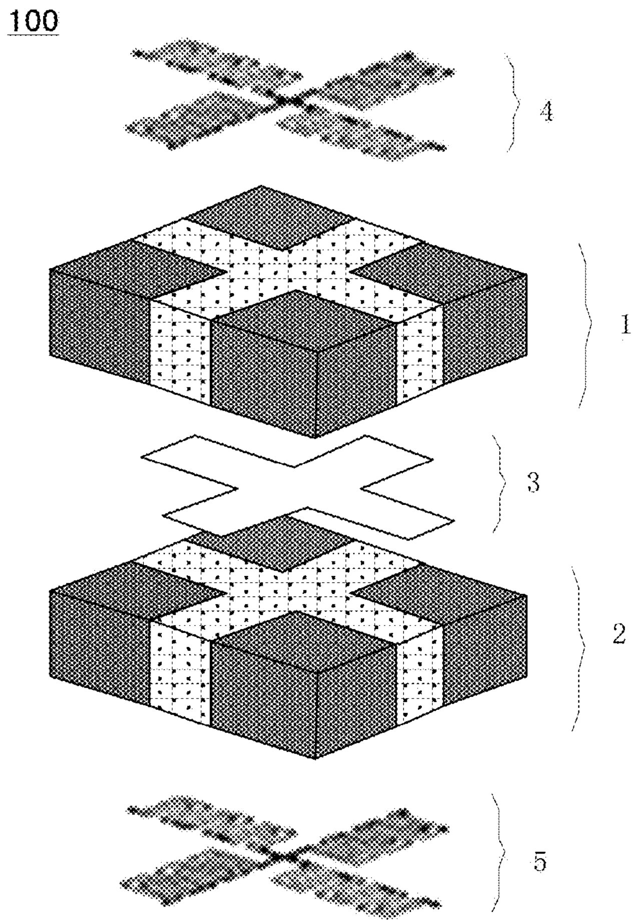
FIG. 1 is a schematic structural diagram of an adjustable radio frequency unit provided in an embodiment of the present application.
Figure 2:
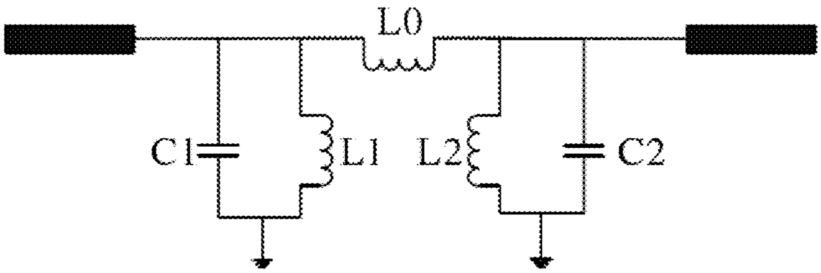
FIG. 2 and FIG. 3 are equivalent circuit diagrams of two radio frequency units in the related art.
Figure 3:
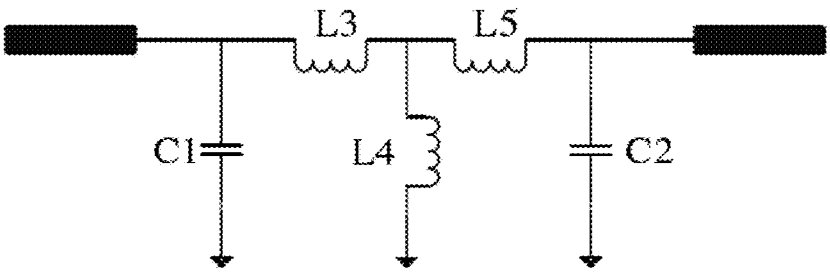
Figure 4:
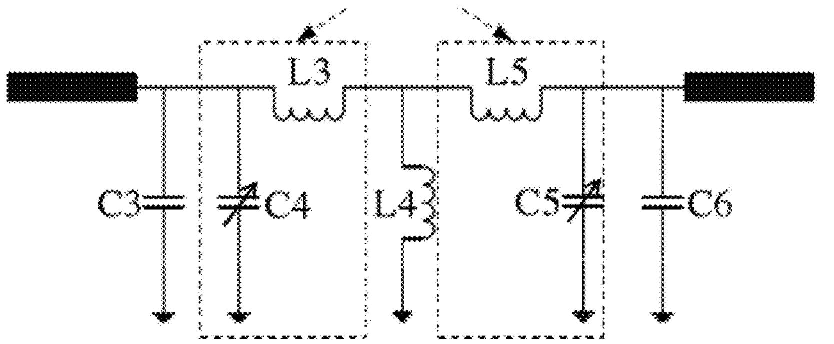
Figure 5:
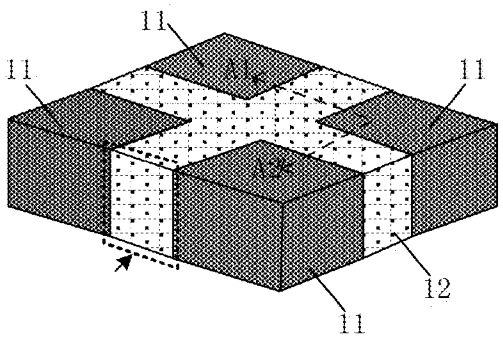
Figure 6:
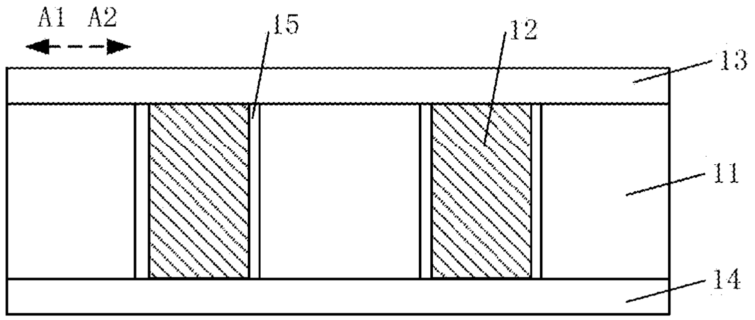
Figure 7:
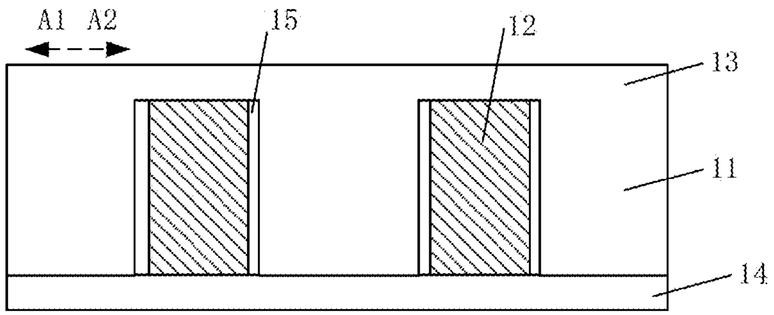
Figure 8:
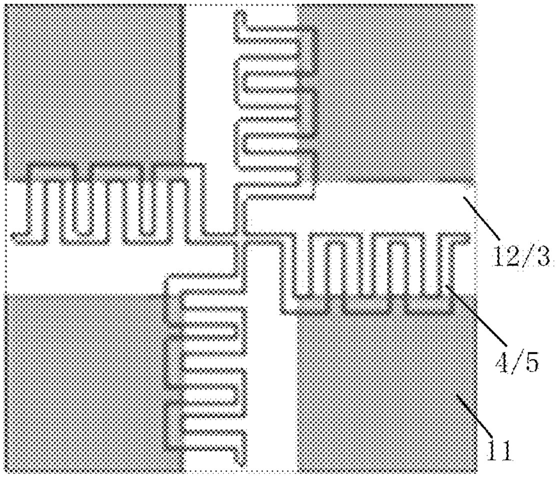
Figure 9:
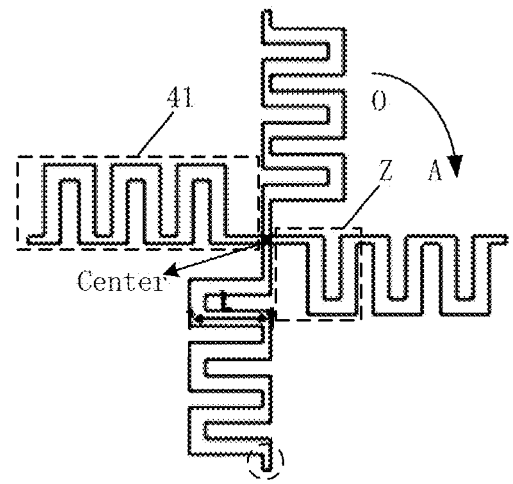
Figure 10:
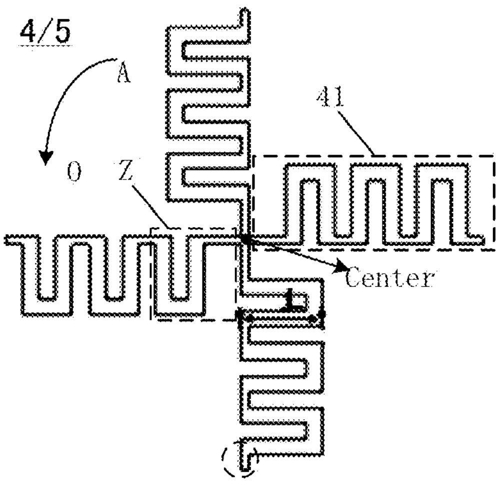
Figure 11:
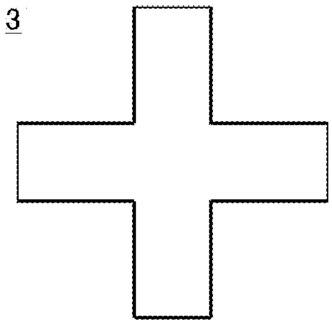
Figure 12:
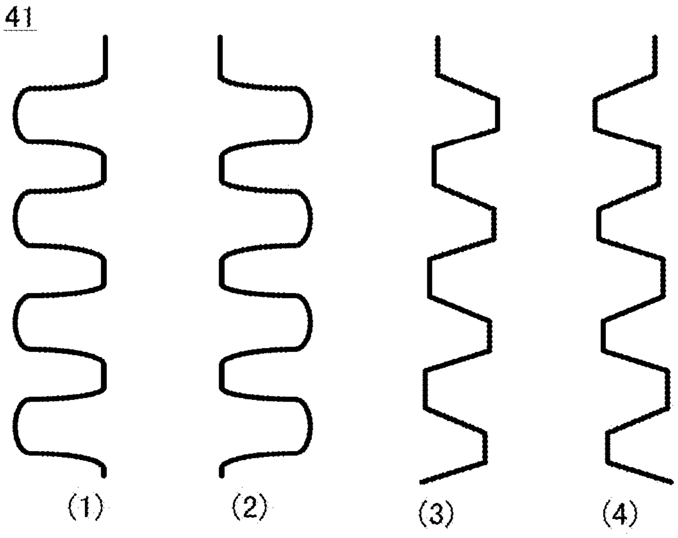
Figure 13:
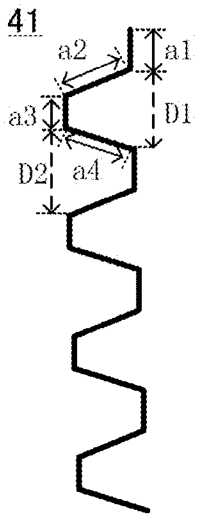
Figure 14:
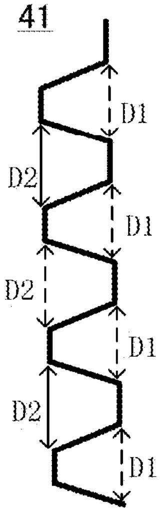
Figure 15:
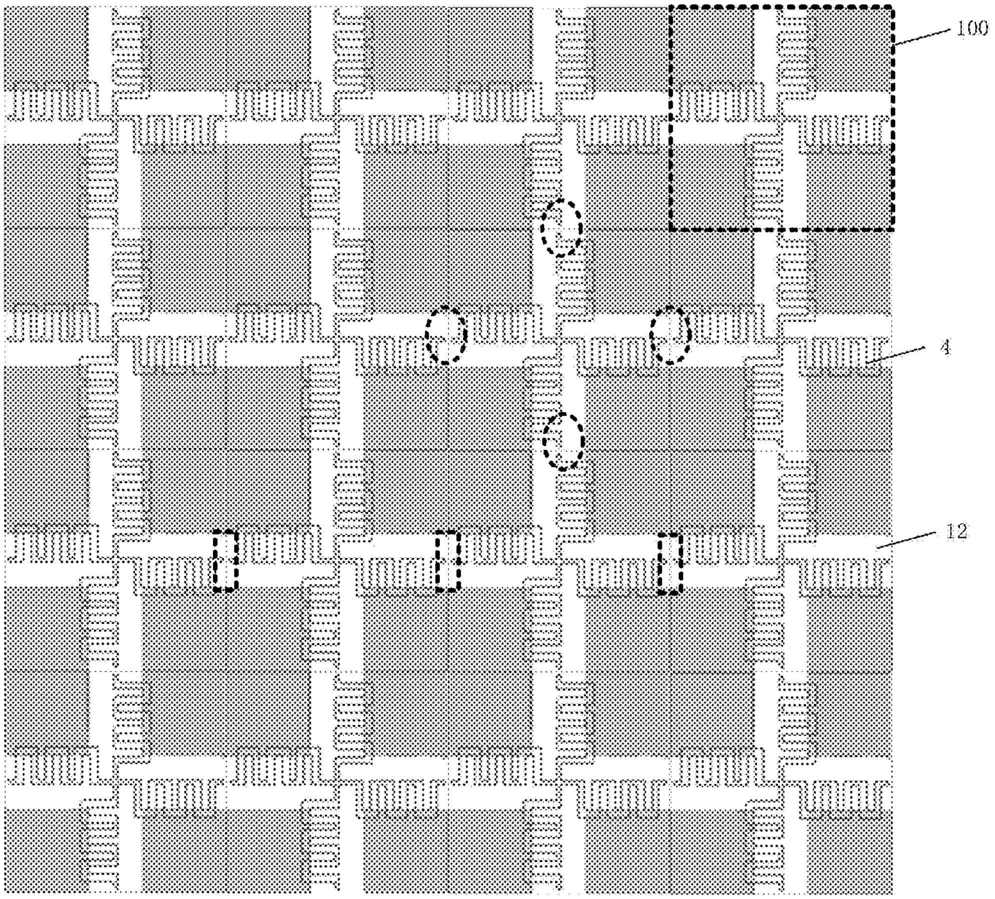

FIC, 4 is an equivalent circuit diagram of an adjustable radio frequency unit provided in an embodiment of the present application;

FIG. 5 is a schematic structural diagram of a first tunable dielectric layer or a second tunable dielectric layer provided in an embodiment of the present application;

FIG. 6 and FIG. 7 are two sectional diagrams of FIG. 5 in a direction A1A2, respectively:

FIG. 8 is a top structural diagram of an adjustable radio frequency unit provided in an embodiment of the present application;

FIG. 9 and FIG. 10 are two schematic structural diagrams of a second conductive layer or a third conductive layer provided in an embodiment of the present application;

FIG. 11 is a schematic structural diagram of a first conductive layer provided in an embodiment of the present application;

FIG. 1), FIG. 2), FIG. 3), and FIG. 4) in FIG. 12, FIG. 13 and FIG. 14 are schematic structural diagrams of six conductive parts provided in an embodiment of the present application; and FIG. 15 is a schematic structural diagram of a filter provided in an embodiment of the present application.

DETAILED DESCRIPTION

The following will give a clear and complete description of the technical solution in the embodiments of the present application in combination with the drawings in the embodiments of the present application. Obviously, the described embodiments are only part of the embodiments of the present application, not all of them. Based on the embodiments in the present application, all other embodiments obtained by ordinary technicians in the art without creative work fall within the scope of protection in the present application.

In the drawings, the thickness of the area and layer may be exaggerated for clarity. The same reference numerals in the drawings represent the same or similar structures, so their detailed description will be omitted. In addition, the attached drawings are only schematic illustrations of the present application, and are not necessarily drawn to scale.

Unless the context otherwise requires, the term "including" is interpreted as "including, but not limited to" in the entire specification and claims. In the description of the specification, the terms "one embodiment", "some embodiments", "exemplary embodiments", "examples", "specific examples" or "some examples" are intended to indicate that specific features, structures, materials or characteristics related to the embodiment or example are included in at least one embodiment or example of the present application. The schematic representation of the above terms does not necessarily refer to the same embodiment or example. In addition, the specific features, structures, materials or features described may be included in any one or more embodiments or examples in any appropriate manner.

Most of traditional spatial filters are designed to adopt a resonant structure. However, such a spatial filter has only one resonant point, and its working frequency bandwidth is relatively narrow. In order to increase the frequency bandwidth, a plurality of resonant structural units are cascaded together in the related art. However, when the plurality of resonant structural units are cascaded, the size of a gap between two adjacent resonant structural units is required to be ¼ of a central wavelength, which greatly increases spatial sizes of the filters, for example, sectional heights of the filters are increased, and application ranges of the spatial filters are limited.

Based on this, an embodiment of the present application provides an adjustable radio frequency unit 100. With reference to FIG. 1, the adjustable radio frequency unit 100 includes: a first tunable dielectric layer 1 and a second tunable dielectric layer 2;

a first conductive layer 3 located between the first tunable dielectric layer 1 and the second tunable dielectric layer 2;

a second conductive layer 4 located on the side, away from the first conductive layer 3, of the first tunable dielectric layer 1; and a third conductive layer 5 located on the side, away from the first conductive layer 3, of the second tunable dielectric layer 2;

wherein orthographic projections of the first conductive layer 3, the second conductive layer 4 and the third conductive layer 5 on the first tunable dielectric layer 1 at least partially overlap with one another.

In an actual application, the radio frequency unit is used to modulate a signal to a target frequency band range, and emit the signal in this frequency band range (signal passing), and block signals out of this frequency band range (the signals are reflected). The adjustable radio frequency unit refers to a radio frequency unit of which the target frequency and range is adjustable.

In an exemplary embodiment, dielectric constants of the first tunable dielectric layer 1 and the second tunable dielectric layer 2 may vary with the variation of an external environment where they are located. For example, when an electric field environment where the first tunable dielectric layer 1 is located and an electric field environment where the second tunable dielectric layer 2 is located vary, dielectric constants of the first tunable dielectric layer 1 and the second tunable dielectric layer 2 may vary with the variation of electric fields.

Herein, the thickness of the first tunable dielectric layer 1 and the thickness of the second tunable dielectric layer 2 are not limited no matter whether they are the same. In some embodiments, the thickness of the first tunable dielectric layer 1 may be set to be the same as the thickness of the second tunable dielectric layer 2, so that a capacitor formed by the first conductive layer 3, the first tunable dielectric layer 1 and the second conductive layer 4 is the same as a capacitor formed by the first conductive layer 3, the second tunable dielectric layer 2 and the third conductive layer 5, the target frequency band range of the adjustable radio frequency unit 100 is easier to be adjusted and controlled, and then, the control accuracy of the target frequency band range of the adjustable radio frequency unit 100 is improved.

Herein, the dielectric constants of the first tunable dielectric layer 1 and the second tunable dielectric layer 2 are not limited no matter whether they are the same, and can be specifically determined according to a range of a frequency of an electromagnetic wave signal designed to be passable for the adjustable radio frequency unit 100.

In an exemplary embodiment, a material of each of the first tunable dielectric layer 1 and the second tunable dielectric layer 2 may include a material of which the dielectric constant is variable under the external environment, such as a material of which the dielectric constant is variable under an electric field, e.g., an electrically-controlled dielectric material, wherein the electrically-controlled dielectric material may include at least one of a ferrite, a ferroelectricity or a liquid crystal.

Herein, the materials of the first tunable dielectric layer 1 and the second tunable dielectric layer 2 are not limited no matter whether they are the same. Exemplarily, in order to facilitate controlling the signal to be modulated to the target frequency band range, materials having the same dielectric constants can be selected to be set, so that the dielectric constant of the first tunable dielectric layer 1 is the same as the dielectric constant of the second tunable dielectric layer 2. Certainly, in an actual application, in order to lower the cost and the process preparation difficulty, the material of the first tunable dielectric layer 1 may be set to be the same as the material of the second tunable dielectric layer 2.

In an exemplary embodiment, each of the first tunable dielectric layer 1 and the second tunable dielectric layer 2 may include a plurality of parts, a material of at least one part of the first tunable dielectric layer 1 is a material of which the dielectric constant is variable under the external environment, and a material of at least one part of the second tunable dielectric layer 2 is a material of which the dielectric constant is variable under the external environment.

In an exemplary embodiment, a material of each of the first conductive layer 3, the second conductive layer 4 and the third conductive layer 5 may include a conductive material such as a metal material, a metal oxide material, an inorganic nonmetal material, wherein the metal material may include at least one of copper (Cu), gold (Au), aluminum (Al) and silver (Ag), the metal oxide material may include indium-tin oxide (ITO) and zine-tin oxide (IZO)), and the inorganic nonmetal material may include a doped silicon material.

Herein, the materials of the first conductive layer 3, the second conductive layer 4 and the third conductive layer 5 are not limited no matter whether they are the same, and can be specifically determined according to an actual design and preparation process of the radio frequency unit.

Herein, the thickness of each of the first conductive layer 3, the second conductive layer 4 and the third conductive layer 5 is not limited and can be specifically determined according to an actual design and preparation process of the radio frequency unit.

In an exemplary embodiment, the first tunable dielectric layer 1 is located in an electric field formed by the first conductive layer 3 and the second conductive layer 4, and the second tunable dielectric layer 2 is located in an electric field formed by the first conductive layer 3 and the third conductive layer 5.

Herein, electric field strengths of the electric field formed by the first conductive layer 3 and the second conductive layer 4 and the electric field formed by the first conductive layer 3 and the third conductive layer 5 are not limited no matter whether they are the same. In some embodiments, in order to facilitate the signal to be modulated to the target frequency band range, the same first electric signal may be input into the second conductive layer 4 and the third conductive layer 5, a second electric signal may be input into the first conductive layer 3, and a voltage of the first electric signal is greater than or equal to a voltage of the second electric signal, so that the electric field strength of the electric field formed by the first conductive layer 3 and the second conductive layer 4 is the same as the electric field strength of the electric field formed by the first conductive layer 3 and the third conductive layer 5.

In an exemplary embodiment, the orthographic projections of the first conductive layer 3, the second conductive layer 4 and the third conductive layer 5 on the first tunable dielectric layer 1 at least partially overlap with one another, which includes, but is not limited to the following situations:

firstly, the orthographic projections of the first conductive layer 3, the second conductive layer 4 and the third conductive layer 5 on the first tunable dielectric layer 1 partially overlap with one another; it can be understood that, at the moment, an area of a region where the orthographic projections of the first conductive layer 3, the second conductive layer 4 and the third conductive layer 5 overlap with one another is less than the area of each of the orthographic projections; and secondly, the orthographic projections of the first conductive layer 3, the second conductive layer 4 and the third conductive layer 5 on the first tunable dielectric layer 1 completely overlap with one another; it can be understood that, at the moment, an outer contour of the orthographic projection of the first conductive layer 3 on the first tunable dielectric layer 1 overlaps with an outer contour of the orthographic projection of the second conductive layer 4 on the first tunable dielectric layer 1, and the outer contour of the orthographic projection of the second conductive layer 4 on the first tunable dielectric layer 1 overlaps with an outer contour of the orthographic projection of the third conductive layer 5 on the first tunable dielectric layer 1.

The size of the capacitor formed by the first conductive layer 3, the first tunable dielectric layer 1 and the second conductive layer 4 is related to the size of an effective region where the orthographic projections of the first conductive layer 3, the first tunable dielectric layer 1 and the second conductive layer 4 overlap with one another, and the size of the capacitor formed by the first conductive layer 3, the second tunable dielectric layer 2 and the third conductive layer 5 is related to the size of an effective region where the first conductive layer 3, the second tunable dielectric layer 2 and the third conductive layer 5 overlap with one another.

It should be noted that the "orthographic projection" on the first tunable dielectric layer 1 refers to a projection on the first tunable dielectric layer 1 in a direction perpendicular to the first tunable dielectric layer 1, and related descriptions involved hereinafter are similar to the description for a meaning shown herein so as not to be repeated again.

FIG. 2 provides a schematic circuit diagram of a two-order band pass filter formed by cascading two parallel resonant circuits in the related art, wherein the schematic circuit diagram shows a π-shape circuit, and the π-shape circuit shown in FIG. 2 may be converted into a T-shaped circuit shown in FIG. 3 according to a conversion relationship between a π-shape network and a T-shaped network in a low-frequency circuit.

In an embodiment of the present application, by evolving the T-shaped circuit shown in FIG. 3, splitting a capacitor C1 in each of the parallel resonant circuits into a constant-value capacitor C3 and a variable capacitor C4 and splitting a capacitor C2 into a constant-value capacitor C6 and a variable capacitor C5, a schematic diagram of a circuit structure of a novel two-order band pass filter shown in FIG. 4 is obtained.

A structure in a rectangular dashed box in FIG. 4 may be replaced with a transmission line. In the adjustable radio frequency unit 100 provided in the embodiment of the present application, the first tunable dielectric layer 1 and the second tunable dielectric layer 2 are equivalent to transmission lines. For example, a signal may be transmitted from the second conductive layer 4 to the first conductive layer by the first tunable dielectric layer 1 under a preset condition. The schematic diagram of the circuit structure shown in FIG. 4 is equivalent to a serial connection structure of a capacitor structure, a transmission line, an inductor structure, the transmission line and the capacitor structure. As shown in FIG. 4 and FIG. 1, the constant-value capacitor C3 is generated on a plane on which the second conductive layer 4 is located, the constant-value capacitor C6 is generated on a plane on which the third conductive layer 5 is located, the first conductive layer 3, the first tunable dielectric layer 1 and the second conductive layer 4 jointly generate an inductor structure L3 and the variable capacitor C4, the first conductive layer 3, the second tunable dielectric layer 2 and the third conductive layer 5 jointly generate an inductor structure L5 and the variable capacitor C5, and an inductor L4 is generated on a plane on which the first conductive layer 3 is located.

It should be noted that, herein, capacitance values of the constant-value capacitor C3 and the constant-value capacitor C6 are not limited no matter whether they are equal, the maximum capacitance values of the variable capacitor C4 and the variable capacitor C5 are not limited no matter whether they are equal, and inductance values of the inductor structure L3 and the inductor structure L5 are not limited no matter whether they are equal.

Exemplarily, in order to facilitate controlling and adjusting the target frequency band range of the adjustable radio frequency unit 100 to improve the control accuracy, the capacitance values of the constant-value capacitor C3 and the constant-value capacitor C6 may be set to be equal, the maximum capacitance values of the variable capacitor C4 and the variable capacitor C5 may be set to be equal, and the inductance values of the inductor structure L3 and the inductor structure 15 may be set to be equal.

The structure of the adjustable radio frequency unit 100 provided in the embodiment of the present application is designed according to a circuit structural diagram shown in FIG. 4. The dielectric constants of the first tunable dielectric layer 1 and the second tunable dielectric layer 2 in the adjustable radio frequency unit 100 provided in the embodiment of the present application can be adjusted to provide a variable capacitor, so that the target frequency band range of the adjustable radio frequency unit 100 can be adjusted, then, the bandwidth of a pass band of the adjustable radio frequency unit 100 is increased, the a tunable frequency bandwidth is achieved, application fields of the radio frequency unit are expanded, and the working flexibility is improved.

In some embodiments of the present application, with reference to FIG. 1, the orthographic projections of the first conductive layer 3, the second conductive layer 4 and the third conductive layer 5 on the first tunable dielectric layer 1 are all located in an orthographic projection of the second tunable dielectric layer 2 on the first tunable dielectric layer 1; and orthographic projections of the first conductive layer 3, the second conductive layer 4 and the third conductive layer 5 on the second tunable dielectric layer 2 are all located in an orthographic projection of the first tunable dielectric layer 1 on the second tunable dielectric layer 2.

In an exemplary embodiment, an orthographic projection of A is located in an orthographic projection of B, which includes two situations: firstly, an outer contour of the orthographic projection of A is located in an outer contour of the orthographic projection of B; and secondly, the outer contour of the orthographic projection of A overlaps with the outer contour of the orthographic projection of B. Meanings in related descriptions involved to the embodiment of the present application are similar to the meaning shown herein so as not to be repeated hereinafter.

Then, the orthographic projections of the first conductive layer 3, the second conductive layer 4 and the third conductive layer 5 on the first tunable dielectric layer 1 are all located in the orthographic projection of the second tunable dielectric layer 2 on the first tunable dielectric layer 1, which may be understood that: outer contours of the orthographic projections of the first conductive layer 3, the second conductive layer 4 and the third conductive layer 5 on the first tunable dielectric layer 1 are all located in an outer contour of the orthographic projection of the second tunable dielectric layer 2 on the first tunable dielectric layer 1; or the outer contours of the orthographic projections of the first conductive layer 3, the second conductive layer 4 and the third conductive layer 5 on the first tunable dielectric layer 1 all overlap with the outer contour of the orthographic projection of the second tunable dielectric layer 2 on the first tunable dielectric layer 1.

The meaning that the orthographic projections of the first conductive layer 3, the second conductive layer 4 and the third conductive layer 5 on the second tunable dielectric layer 2 are all located in the orthographic projection of the first tunable dielectric layer 1 on the second tunable dielectric layer 2 is not repeated again.

In some embodiments of the present application, as shown in FIG. 5 and FIG. 6, each of the first tunable dielectric layer 1 and the second tunable dielectric layer 2 includes a first substrate 13 (unshown in FIG. 5), a second substrate 14 (unshown in FIG. 5) and tunable dielectric parts 12 and fixed dielectric parts 11 which are located between the first substrate 13 and the second substrate 14; and the tunable dielectric parts 12 are located between two adjacent fixed dielectric parts 11; and with reference to FIG. 1, orthographic projections of the tunable dielectric parts 12 in the first tunable dielectric layer 1 on the first substrate 13 overlap with orthographic projections of the tunable dielectric parts 12 in the second tunable dielectric layer 2 on the first substrate 13.

In an exemplary embodiment, each of the first substrate 13 and the second substrate 14 is made of an insulating material. Exemplarily, each of the first substrate 13 and the second substrate 14 is made of rigid plastic such as Polycarbonate (PC), Copolymers of Cycloolefin (COP), Polymethyl Methacrylate (PMMA) or Polyethylene Terephthalate (PET); or low-loss optical glass.

Herein, the material of the first substrate 13 and the material of the second substrate are not limited no matter whether they are the same.

In an exemplary embodiment, the fixed dielectric parts 11 are made of a material of which the dielectric constant does not vary with the external environment; or a material of which the dielectric constant varies a little or has almost negligible variation in the case that the external environment varies. Herein, the kind of the material is not limited and can be specifically determined according to an actual design demand and preparation process for the dielectric constant.

Herein, the materials of the fixed dielectric parts 11 and the materials of the first substrate 13 and the second substrate 14 are not limited no matter whether they are the same.

In an exemplary embodiment, in order to facilitate controlling and adjusting the target frequency band range of the adjustable radio frequency unit 100, the fixed dielectric parts 11, the first substrate 13 and the second substrate 14 can be respectively prepared by selecting materials of which the dielectric constants are the same or similar.

In an exemplary embodiment, materials of the tunable dielectric parts 12 include a material, such as an electrically-controlled dielectric material, of which the dielectric constant is variable, wherein the electrically-controlled dielectric material includes liquid crystals. The tunable dielectric parts 12 as well as the first substrate 13 and the second substrate 14 which are located on two sides of the tunable dielectric parts 12 can be regarded as a liquid crystal box as a whole, and the liquid crystals in the liquid crystal box deflect under the action of an external electric field, so that a dielectric constant of the liquid crystal box varies, the capacitance values of the variable capacitor C4 and the variable capacitor C5 are varied, an output signal of the resonant circuit is varied, and then, the target frequency range of the adjustable radio frequency unit is varied. It should be noted that the target frequency range of the adjustable radio frequency unit refers to a frequency range of a signal capable of passing through the adjustable radio frequency unit.

Herein, the kinds of the liquid crystals included in the tunable dielectric pants 12 and the number of the kinds of the liquid crystals are not limited and can be specifically determined according to an actual situation.

Exemplarily, the tunable dielectric parts 12 may include single kind of liquid crystals; or the tunable dielectric parts 12 may include mixed crystals formed from a plurality of kinds of liquid crystals.

In some embodiments of the present application, with reference to FIG. 7, one of the first substrate 13 and the second substrate 14 forms an integrated structure with the fixed dielectric parts 11.

In an actual application, in order to lower the preparation process difficulty, shorten the preparation period and reduce the cost, one of the first substrate 13 and the second substrate 14 is set to be made of the same material as the fixed dielectric parts 11, and one of the first substrate 13 and the second substrate 14 is set to form an integrated structure with the fixed dielectric parts 11.

Exemplarily, with reference to FIG. 7, the first substrate 13 may be set to form an integrated structure with the fixed dielectric parts 11.

Exemplarily, the second substrate 14 may be set to form an integrated structure with the fixed dielectric parts 11.

In some embodiments of the present application, as shown in FIG. 1 and FIG. 8, orthographic projections of the first conductive layer 3, the second conductive layer 4 and the third conductive layer 5 on the first substrate 13 respectively partially overlap with the orthographic projections of the tunable dielectric parts 12 on the first substrate 13; and the orthographic projections of the first conductive layer 3, the second conductive layer 4 and the third conductive layer 5 on the first substrate 13 respectively partially overlap with orthographic projections of the fixed dielectric parts 11 on the first substrate 13.

Herein, the area of the region where the orthographic projections of the first conductive layer 3, the second conductive layer 4 and the third conductive layer 5 on the first substrate 13 respectively overlap with the orthographic projections of the tunable dielectric parts 12 on the first substrate 13 and the region of an area where the orthographic projections of the first conductive layer 3, the second conductive layer 4 and the third conductive layer 5 on the first substrate 13 respectively overlap with the orthographic projections of the fixed dielectric parts 11 on the first substrate 13 are not limited.

Exemplarily, the area of the region where the orthographic projections of the three conductive layers overlap with the orthographic projections of the tunable dielectric parts 12 may be set to be greater than or equal to the area of the region where the orthographic projections of the three conductive layers overlap with the orthographic projections of the fixed dielectric parts 11; or the area of the region where the orthographic projections of the three conductive layers overlap with the orthographic projections of the tunable dielectric parts 12 may also be set to be less than the area of the region where the orthographic projections of the three conductive layers overlap with the orthographic projections of the fixed dielectric parts 11.

In some embodiments of the present application, as shown in FIG. 1 and FIG. 8, the area of the region where the orthographic projections of the first conductive layer 3, the second conductive layer 4 and the third conductive layer 5 on the first substrate 13 respectively overlap with the orthographic projections of the tunable dielectric parts 12 on the first substrate 13 may be set to be greater than the area of the region where the orthographic projections of the first conductive layer 3, the second conductive layer 4 and the third conductive layer 5 on the first substrate 13 respectively overlap with the orthographic projections of the fixed dielectric parts 11 on the first substrate 13.

In this way, the maximum capacitance values of the variable capacitor C4 and the variable capacitor C5 can be increased, so that the adjusting space of the target frequency range of the adjustable radio frequency unit can be increased, the frequency adjusting flexibility of the adjustable radio frequency unit can be improved, and the application fields or application scenarios of the adjustable radio frequency unit can be widened.

In some embodiments of the present application, the sizes of the tunable dielectric parts 12 of the first tunable dielectric layer 1 in a direction perpendicular to a plane where the first substrate 13 is located are equal to the sizes of the tunable dielectric parts 12 of the second tunable dielectric layer 2 in the direction perpendicular to the plane where the first substrate 13 is located; and the sizes of the fixed dielectric parts 11 of the first tunable dielectric layer 1 in the direction perpendicular to the plane where the first substrate 13 is located are equal to the sizes of the fixed dielectric parts 11 of the second tunable dielectric layer 2 in the direction perpendicular to the plane where the first substrate 13 is located.

With FIG. 1 as an example, the sizes of the tunable dielectric parts 12 in the direction perpendicular to the plane where the first substrate 13 is located are heights of the tunable dielectric parts 12, and meanings in other related descriptions are similar to this.

Herein, the heights of the tunable dielectric parts 12 of the first tunable dielectric layer 1 and the heights of the fixed dielectric parts 11 of the first tunable dielectric layer 1 are not limited no matter whether they are the same, and can be specifically determined according to a specific situation.

Herein, the heights of the tunable dielectric parts 12 of the second tunable dielectric layer 2 and the heights of the fixed dielectric parts 11 of the second tunable dielectric layer 2 are not limited no matter whether they are the same, and can be specifically determined according to a specific situation.

Exemplarily, the heights of the tunable dielectric parts 12 of the first tunable dielectric layer 1 may be set to be greater than or equal to the heights of the fixed dielectric parts 11 of the first tunable dielectric layer 1, and the heights of the tunable dielectric parts 12 of the second tunable dielectric layer 2 may be set to be greater than or equal to the heights of the fixed dielectric parts 11 of the second tunable dielectric layer 2.

Exemplarily, the heights of the tunable dielectric parts 12 of the first tunable dielectric layer 1 may be set to be equal to the heights of the fixed dielectric parts 11 of the first tunable dielectric layer 1, the heights of the tunable dielectric parts 12 of the second tunable dielectric layer 2 may be set to be equal to the heights of the fixed dielectric parts 11 of the second tunable dielectric layer 2, and the heights of the tunable dielectric parts 12 of the first tunable dielectric layer 1 may be set to be equal to the heights of the tunable dielectric parts 12 of the second tunable dielectric layer 2. In this way, in the case that the material of the first tunable dielectric layer 1 is the same as the material of the second tunable dielectric layer 2, the material of the second conductive layer 4 is the same as the material of the third conductive layer 5, and the area of the region where the orthographic projections of the first conductive layer 3, the first tunable dielectric layer 1 and the second conductive layer 4 overlap with one another is the same as the area of the region where the orthographic projections of the first conductive layer 3, the second tunable dielectric layer 2 and the third conductive layer 5 overlap with one another, as shown in FIG. 1 and FIG. 4, the capacitance values of the capacitor C3 and the capacitor C6 are the same, and the maximum capacitance values of the capacitor C4 and the capacitor C5 are the same, which is beneficial to the control and adjustment of the target frequency band range of the adjustable radio frequency unit 100, the improvement of the control accuracy and the working flexibility, the lowering of the preparation process difficulty and the reduction of the cost.

In some embodiments of the present application, the orthographic projection of the second conductive layer 4 on the first substrate 13 overlaps with the orthographic projection of the third conductive layer 5 on the first substrate 13, and the orthographic projection of the second conductive layer 4 on the first substrate 13 is located in the orthographic projection of the first conductive layer 3 on the first substrate 13.

In an exemplary embodiment, the orthographic projection of the second conductive layer 4 on the first substrate 13 overlaps with the orthographic projection of the third conductive layer 5 on the first substrate 13, which may be understood as that an outer contour of the orthographic projection of the second conductive layer 4 on the first substrate 13 overlaps with an outer contour of the orthographic projection of the third conductive layer 5 on the first substrate 13.

In an exemplary embodiment, the orthographic projection of the second conductive layer 4 on the first substrate 13 is located in the orthographic projection of the first conductive layer 3 on the first substrate 13, which includes two situations;

- firstly, the outer contour of the orthographic projection of the second conductive layer 4 on the first substrate 13 is located in an outer contour of the orthographic projection of the first conductive layer 3 on the first substrate 13; and
- secondly, the outer contour of the orthographic projection of the second conductive layer 4 on the first substrate 13 overlaps with the outer contour of the orthographic projection of the first conductive layer 3 on the first substrate 13.

In an embodiment of the present application, by setting that the outer contour of the orthographic projection of the second conductive layer 4 on the first substrate 13 overlaps with the outer contour of the orthographic projection of the third conductive layer 5 on the first substrate 13, the capacitance values of the capacitor C3 and the capacitor C6 in the parallel resonant circuit shown in FIG. 4 are the same, thereby more facilitating controlling the adjustable radio frequency unit to adjust the target frequency range, and improving the working flexibility.

In some embodiments of the present application, a difference value of a conductivity of a material of the second conductive layer 4 and a conductivity of a material of the third conductive layer 5 is less than or equal to a preset value.

The preset value may be adjusted according to a requirement on the adjustment accuracy of the adjustable radio frequency unit. Herein, a specific value of the above-mentioned preset value is not limited. Exemplarily, the above-mentioned preset value may be less than or equal to 5% or 8% of the conductivity of the material of the second conductive layer 4.

Exemplarily, the above-mentioned preset value may be less than or equal to 5% or 8% of the conductivity of the material of the third conductive layer 5.

In an actual application, the conductivity of the material of the second conductive layer 4 may be set to be the same as the conductivity of the material of the third conductive layer 5, and even the material of the second conductive layer 4 may be set to be the same as the material of the third conductive layer 5, so that the parallel resonant circuit shown in FIG. 4 can form a symmetric circuit, then, it is more convenient to control the adjustable radio frequency unit to adjust the target frequency range, and the frequency adjustment accuracy and the working flexibility are improved.

In some embodiments of the present application, as shown in FIG. 5 and FIG. 11, the orthographic projections of the tunable dielectric parts 12 on the first substrate 13 are located in the orthographic projection of the first conductive layer 3 on the first substrate 13, and patterns of the orthographic projections of the tunable dielectric parts 12 on the first substrate 13 have the same shape with a pattern of the orthographic projection of the first conductive layer 3 on the first substrate 13.

In some embodiments of the present application, the patterns of the orthographic projections of the tunable dielectric parts 12 on the first substrate 13 are of polygons, arcs or combinations of the polygons and the arcs.

Exemplarily, the polygons may include rectangles, rhombuses and parallelograms, and the arcs may include sectors, semicircles and semi-ellipses.

Exemplarily, the patterns of the orthographic projections of the tunable dielectric parts 12 on the first substrate 13 and the pattern of the orthographic projection of the first conductive layer 3 on the first substrate 13 are both polygons such as dodecagons shown in FIG. 11.

In some embodiments of the present application, with reference to FIG. 6 or FIG. 7, each of the first tunable dielectric layer 1 and the second tunable dielectric layer 2 further includes a connecting part 15 located between the first substrate 13 and the second substrate 14 and configured to fixedly connect the tunable dielectric parts 12 and the fixed dielectric parts 11.

In an exemplary embodiment, the connecting part 15 may include an Optically Clear Adhesive (OCA) or a seal.

In some embodiments of the present application, a difference value of a dielectric constant of each of a material of the first substrate 13, a material of the second substrate 14 and a material of the connecting part 15 and a dielectric constant of a material of each of the fixed dielectric parts 11 is less than or equal to a preset value.

In an exemplary embodiment, the preset value is greater than or equal to 0 and is less than or equal to 0.3.

In some embodiments of the present application, with reference to FIG. 9 or FIG. 10, each of the second conductive layer 4 and the third conductive layer 5 includes a plurality of conductive parts 41 arranged in a first direction and electrically connected together; and the first direction is a clockwise direction OA or a counter-clockwise direction AO.

The plurality of conductive parts 41 include two or more conductive parts 41. In an embodiment of the present application, an example in which each of the second conductive layer 4 and the third conductive layer 5 includes four conductive parts 41 is described.

In some embodiments of the present application, with reference to FIG. 9 or FIG. 10, the plurality of conductive parts 41 of the second conductive layer 4 are symmetrically arranged with a geometric center of the second conductive layer as a symmetric point; and the geometric center of the second conductive layer 4 is located on a position where the plurality of conductive parts 41 of the second conductive layer 4 are connected; and the third conductive layer 5 has the same structure with the second conductive layer 4.

In some embodiments of the present application, with reference to FIG. 9 or FIG. 10, each of the conductive parts 41 includes a plurality of bent structures Z connected in sequence; and herein, the number of the bent structures Z included in the same conductive part 41 is not limited. Exemplarily, the same conductive part 41 may include three bent structures Z, or one conductive part 41 may include three point one bent structures Z, or one conductive part 41 may include three point five bent structures Z.

The number of the bent structures Z included in the same conductive part 41 may be determined according to a designed length of the conductive part 41. In FIG. 9 or FIG. 10, there are about zero point one bent structures Z in an area marked by a circle formed by a dashed line.

As shown in FIG. 8, FIG. 9), FIG. (1), FIG. 2), FIG. 3) and FIG. 4) in FIG. 12 and FIG. 13, each of the bent structures Z includes a first line segment a1, a second line segment a2, a third line segment a3 and a fourth line segment a4 connected in sequence, a first included angle is formed between an extension direction of the first line segment a1 and an extension direction of the second line segment a2, a second included angle is formed between the extension direction of the second line segment a2 and an extension direction of the third line segment a3, and a third included angle is formed between the extension direction of the third line segment a3 and an extension direction of the fourth line segment a4; and the first included angle, the second included angle and the third included angle are all greater than 0° and are less than 180°.

In an exemplary embodiment, with reference to FIG. 14, the minimum distance D1 from the first line segment a1 to the fourth line segment a4 of the same bent structure Z in the conductive part 41 is equal.

In an exemplary embodiment, the minimum distance D2 from the third line segment a3 of the previous bent structure Z to the third line segment a3 of the next bent structure Z in the conductive part 41 is equal.

In an exemplary embodiment, D1 is equal to D2.

In an exemplary embodiment, the first included angle, the second included angle and the third included angle are all right angles. At the moment, the first line segment a1 is parallel to the third line segment a3, and the second line segment a2 is parallel to the fourth line segment a4.

In an exemplary embodiment, the first line segment a1 of each of the bent structures Z, in the same conductive part 41 is equal to the third line segment a3 of each of the bent structures Z, and the second line segment a2 of each of the bent structures Z in the same conductive part 41 is equal to the fourth line segment a4 of each of the bent structures Z.

In an exemplary embodiment, with reference to FIG. 9 or FIG. 10, lengths of the second line segment a2 and the fourth line segment a4 are related to the inductance value of the inductor structure L3 or the inductor structure L5 shown in FIG. 4, and generally, the greater the lengths, the greater the inductance value. The minimum distance D1 from the first line segment a1 to the fourth line segment a4 of the same bent structure Z and the minimum distance D2 from the third line segment a3 of the previous bent structure Z to the third line segment a3 of the next bent structure Z are related to the capacitance value of the capacitor C3 or the capacitor C6, and generally, the greater the values of D1 and D2, the greater the capacitance value.

In some embodiments of the present application, the adjustable radio frequency unit 100 further includes a first bonding layer, a second bonding layer, a third bonding layer and a fourth bonding layer; the first bonding layer is located between the first conductive layer 3 and the first tunable dielectric layer 1, the second bonding layer is located between the first conductive layer 1 and the second tunable dielectric layer 2, the third bonding layer is located between the second conductive layer 4 and the first tunable dielectric layer 1, and the fourth bonding layer is located between the third conductive layer 5 and the second tunable dielectric layer 2; and a difference value of a dielectric constant of a material of each of the first bonding layer, the second bonding layer, the third bonding layer and the fourth bonding layer and a dielectric constant of a material of each of the fixed dielectric parts 11 is less than or equal to a preset value.

In an exemplary embodiment, the preset value is greater than or equal to 0 and is less than or equal to 0.3.

In an exemplary embodiment, each of the first bonding layer, the second bonding layer, the third bonding layer and the fourth bonding layer may be made of an adhesive.

Exemplarily, the first bonding layer, the second bonding layer, the third bonding layer and the fourth bonding layer may be made of materials having the same dielectric constant and may also be made of the same material.

In an embodiment of the present application, by setting that the difference value of the dielectric constant of the material of each of the first bonding layer, the second bonding layer, the third bonding layer and the fourth bonding layer and the dielectric constant of the material of each of the fixed dielectric parts 11 is less than or equal to the preset value, influences of the materials of the first bonding layer, the second bonding layer, the third bonding layer and the fourth bonding layer on a capacitance value of a structure related to the capacitors involved to the adjustable radio frequency unit 100 can be reduced, so that it is more convenient to control the adjustable radio frequency unit 100 to adjust the target frequency range, and the control accuracy and the working flexibility are improved.

In some embodiments of the present application, the adjustable radio frequency unit 100 further includes a first protective layer and a second protective layer, the first protective layer is located on the side, away from the first tunable dielectric layer 1, of the second conductive layer 4, and the second protective layer is located on the side, away from the second tunable dielectric layer 2, of the third conductive layer 5.

In an exemplary embodiment, each of the above-mentioned first protective layer and second protective layer is made of an insulating material with a certain mechanical strength. Exemplarily, the insulating material may be PI, PET or PMMA.

In some embodiments of the present application, materials of the tunable dielectric parts 12 include at least one liquid crystal.

Exemplarily, the materials of the tunable dielectric parts 12 may include a liquid crystal, or the materials of the tunable dielectric parts 12 may include a mixture of a plurality of liquid crystals.

An embodiment of the present application provides a preparation method for an adjustable radio frequency unit. The method includes the following steps.

S901, forming a second conductive layer 4 on a first protective layer, and forming a third conductive layer on a second protective layer.

In an actual application, a vapor deposition method may be adopted to deposit the second conductive layer 4 on the first protective layer and deposit the third conductive layer 5 on the second protective layer. Specifically, with the formation of the second conductive layer 4 as an example, firstly, a second conductive thin film is deposited on the first protective layer and is then patterned to obtain the second conductive layer 4.

S902, forming a first tunable dielectric layer 1 and a second tunable dielectric layer 2, respectively.

With a structure of the first tunable dielectric layer 1 shown in FIG. 7 as an example, a specific preparation process of the first tunable dielectric layer 1 is described. The first tunable dielectric layer 1 includes a first substrate 13 (unshown in FIG. 5), a second substrate 14 (unshown in FIG. 5) as well as tunable dielectric parts 12, fixed dielectric parts 11 and a connecting part 15 located between the first substrate 13 and the second substrate 14.

In an actual application, the fixed dielectric parts 11 are formed on the first substrate and are coated with a seal used for forming the connecting part 15, and a liquid crystal is dropped into an area where the fixed dielectric parts 11 are not disposed on the first substrate (the liquid crystal is used for forming the tunable dielectric parts 12), wherein the seal is located on an edge of the first substrate and an area located between each of the fixed dielectric parts 11 and the liquid crystal; and the second substrate and the first substrate are matched, and the seal is cured. It should be noted that structures of the first tunable dielectric layer 1 and the second tunable dielectric layer 2 are similar to a structure of a liquid crystal display panel in the related art, and specific preparation methods thereof may refer to the related art, but are not repeated herein.

It should be noted that, in the case that the first substrate 13 forms an integrated structure with the fixed dielectric parts 11, a substrate material may be patterned (slotted) to obtain the first substrate 13 and the fixed dielectric parts 11 at the same time.

S903, forming a first conductive layer 3, wherein the first conductive layer 3 may be a chip conductive layer such as a chip metal.

S904, fixing the first conductive layer 3 together with the first tunable dielectric layer 1 and the second tunable dielectric layer 2, respectively, so that the first conductive layer 3 is located between the first tunable dielectric layer 1 and the second tunable dielectric layer 2.

In an actual application, the first conductive layer 3 may be respectively fixed together with the first tunable dielectric layer 1 and the second tunable dielectric layer 2 by using an adhesive.

S905, fixing the surface, on which the first protective layer is not disposed, of the second conductive layer 4 together with the surface, away from the first conductive layer 3, of the first tunable dielectric layer 1.

S906, fixing the surface, on which the second protective layer is not disposed, of the third conductive layer 5 together with the surface, away from the first conductive layer 3, of the second tunable dielectric layer 2.

The adjustable radio frequency unit 100 prepared by using the preparation method provided in the embodiment of the present application is more easily adjusted and controlled in target frequency band range, high in control accuracy, wide in passable frequency band range and high in working flexibility.

An embodiment of the present application provides a filter, with reference to FIG. 15, including a plurality of adjustable radio frequency units 100 mentioned above, the plurality of adjustable radio frequency units 100 being arranged in an array.

In some embodiments of the present application, with reference to an area marked by an elliptic dashed line in FIG. 15, the second conductive layer 4 of each of the adjustable radio frequency units 100 is disconnected, and the third conductive layer 5 of each of the adjustable radio frequency units 100 is disconnected. With reference to an area marked by a rectangular dashed line in FIG. 15, the tunable dielectric parts 12, located on the first tunable dielectric layers, in the plurality of adjustable radio frequency units 100 communicate (for example, a surface of a parallelogram dashed box in the tunable dielectric part 12 of a first tunable dielectric layer in FIG. 5 is connected to a surface of a parallelogram dashed box in the tunable dielectric part 12 of a second first tunable dielectric layer), and the tunable dielectric parts 12, located on the second tunable dielectric layers, in the plurality of adjustable radio frequency units communicate.

The filter provided in the embodiment of the present application has the characteristic of passband adjustability, has a very good transmission characteristic for electromagnetic wave energy within a passband frequency range and has a stronger reflection characteristic for electromagnetic wave energy out of the passband frequency range; and for a variable electromagnetic environment, the filter can be changed to have an appropriate resonant frequency, bandwidth or resonance characteristic and has the advantages of wide working frequency range and low loss and cost so as to have a wide application value in many electromagnetic engineering environments, for example, the filter can be applied to radar, antennae and other wireless communication fields.

Exemplarily, the filter may be used as an antenna housing of an antenna with double frequency bands, thereby avoiding interference when the antenna works in the different frequency bands.

The filter is a tunable band pass filter.

In some embodiments of the present application, the filter further includes a driving unit electrically connected to the adjustable radio frequency units; and the driving unit is configured to be capable of driving each of the adjustable radio frequency units to independently work.

In some embodiments of the present application, the driving unit includes a first driving subunit, a second driving subunit and a grounding wire;

the first driving subunit is located on the side, away from the first tunable dielectric layer 1, of the second conductive layer 4 and is electrically connected to the second conductive layer 4; and the second driving subunit is located on the side, away from the second tunable dielectric layer 2, of the third conductive layer 5 and is electrically connected to the third conductive layer 5, and the first conductive layer 3 of each of the adjustable radio frequency units is electrically connected to the grounding wire.

In an exemplary embodiment, the first driving subunit is used for driving the first tunable dielectric layer 1 and changing the dielectric constant of the first tunable dielectric layer 1, and the second driving subunit is used for driving the second tunable dielectric layer 2 and changing the dielectric constant of the second tunable dielectric layer 2.

Herein, specific structures of the first driving subpart and the second driving subunit are not limited.

In an actual application, each of the first driving subunit and the second driving subunit may refer to the design of a pixel driving circuit in a liquid crystal display technology and may specifically refer to the pixel driving circuit in the related art, the descriptions thereof are omitted herein.

In an exemplary embodiment, in the case that an equivalent circuit (a circuit shown in FIG. 4) of the adjustable radio frequency units in the filter provided in the embodiment of the present application is a symmetric circuit, different first electric signals may be respectively input into the first driving subunit and the second driving subunit, or the same first electric signal may be respectively input into the first driving subunit and the second driving subunit, which may be specifically determined according to a range of a frequency actually required to be adjusted. In an actual application, in order to facilitate control, the same first electric signal may also be respectively input into the first driving subunit and the second driving subunit.

An embodiment of the present application provides an electronic device including the filter mentioned above.

Exemplarily, the electronic device may be any apparatus such as an electronically-controlled scanning antenna, a radar system, an accelerator, a communication base station and a power divider including a tunable band pass filter. The electronic device may further include other structures and components in addition to the filter, which can be specifically determined according to actual situations, but is not limited herein.

The electronic device provided in the embodiment of the present application includes a tunable band pass filter. This filter has a very good transmission characteristic for electromagnetic wave energy within a passband frequency range and has a stronger reflection characteristic for electromagnetic wave energy out of the passband frequency range; and for a variable electromagnetic environment, the filter can be changed to have an appropriate resonant frequency, bandwidth or resonance characteristic and has the advantages of wide working frequency range and low loss and cost so as to have a wide application value in many electromagnetic engineering environments.

The above descriptions are merely specific implementations of the present application, but the protection scope of the present application is not limited thereto. Any variations or replacements that can be readily envisioned by those skilled in the art within the technical scope disclosed by the present application should fall within the protection scope of the present application. Therefore, the protection scope of the present application should be subject to the protection scope defined in the claims.

The invention claimed is:

1. An adjustable radio frequency unit, comprising:

a first tunable dielectric layer and a second tunable dielectric layer;

a first conductive layer located between the first tunable dielectric layer and the second tunable dielectric layer;

a second conductive layer located on the side, away from the first conductive layer, of the first tunable dielectric layer; and a third conductive layer located on the side, away from the first conductive layer, of the second tunable dielectric layer;

wherein orthographic projections of the first conductive layer, the second conductive layer and the third conductive layer on the first tunable dielectric layer at least partially overlap with one another;

wherein the orthographic projections of the first conductive layer, the second conductive layer and the third conductive layer on the first tunable dielectric layer are all located in an orthographic projection of the second tunable dielectric layer on the first tunable dielectric layer; and orthographic projections of the first conductive layer, the second conductive layer and the third conductive layer on the second tunable dielectric layer are all located in an orthographic projection of the first tunable dielectric layer on the second tunable dielectric layer;

wherein each of the first tunable dielectric layer and the second tunable dielectric layer comprises a first substrate, a second substrate, and tunable dielectric parts and fixed dielectric parts which are located between the first substrate and the second substrate; and the tunable dielectric parts are located between two adjacent fixed dielectric parts; and orthographic projections of the tunable dielectric parts in the first tunable dielectric layer on the first substrate overlap with orthographic projections of the tunable dielectric parts in the second tunable dielectric layer on the first substrate;

wherein one of the first substrate and the second substrate forms an integrated structure with the fixed dielectric parts.

2. The adjustable radio frequency unit according to claim 1, wherein orthographic projections of the first conductive layer, the second conductive layer and the third conductive layer on the first substrate partially overlap with the orthographic projections of the tunable dielectric parts on the first substrate, respectively; and the orthographic projections of the first conductive layer, the second conductive layer and the third conductive layer on the first substrate partially overlap with orthographic projections of the fixed dielectric parts on the first substrate, respectively.

3. The adjustable radio frequency unit according to claim 2, wherein an area of a region where the orthographic projections of the first conductive layer, the second conductive layer and the third conductive layer on the first substrate respectively overlap with the orthographic projections of the tunable dielectric parts on the first substrate is greater than an area of a region where the orthographic projections of the first conductive layer, the second conductive layer and the third conductive layer on the first substrate respectively overlap with the orthographic projections of the fixed dielectric parts on the first substrate.

4. The adjustable radio frequency unit according to claim 2, wherein sizes of the tunable dielectric parts of the first tunable dielectric layer in a direction perpendicular to a plane where the first substrate is located are equal to sizes of the tunable dielectric parts of the second tunable dielectric layer in the direction perpendicular to the plane where the first substrate is located; and sizes of the fixed dielectric parts of the first tunable dielectric layer in the direction perpendicular to the plane where the first substrate is located are equal to sizes of the fixed dielectric parts of the second tunable dielectric layer in the direction perpendicular to the plane where the first substrate is located.

5. The adjustable radio frequency unit according to claim 4, wherein the orthographic projection of the second conductive layer on the first substrate overlaps with the orthographic projection of the third conductive layer on the first substrate, and the orthographic projection of the second conductive layer on the first substrate is located in the orthographic projection of the first conductive layer on the first substrate.

6. The adjustable radio frequency unit according to claim 5, wherein a difference value of a conductivity of a material of the second conductive layer and a conductivity of a material of the third conductive layer is less than or equal to a preset value.

7. The adjustable radio frequency unit according to claim 5, wherein the orthographic projections of the tunable dielectric parts on the first substrate are located in the orthographic projection of the first conductive layer on the first substrate, and patterns of the orthographic projections of the tunable dielectric parts on the first substrate have the same shape with a pattern of the orthographic projection of the first conductive layer on the first substrate; and the patterns of the orthographic projections of the tunable dielectric parts on the first substrate are of polygons, arcs or combinations of the polygons and the arcs.

8. The adjustable radio frequency unit according to claim 4, wherein each of the second conductive layer and the third conductive layer comprises a plurality of conductive parts arranged in a first direction and electrically connected together; and the first direction is a clockwise direction or a counter-clockwise direction.

9. The adjustable radio frequency unit according to claim 8, wherein the plurality of conductive parts of the second conductive layer are symmetrically arranged with a geometric center of the second conductive layer as a symmetric point; and the geometric center of the second conductive layer is located on a position where the plurality of conductive parts of the second conductive layer are connected; and a structure of the third conductive layer is the same as a structure of the second conductive layer.

10. The adjustable radio frequency unit according to claim 9, wherein each of the conductive parts comprises a plurality of bent structures connected in sequence; and each of the bent structures comprises a first line segment, a second line segment, a third line segment and a fourth line segment connected in sequence, a first included angle is formed between an extension direction of the first line segment and an extension direction of the second line segment, a second included angle is formed between the extension direction of the second line segment and an extension direction of the third line segment, and a third included angle is formed between the extension direction of the third line segment and an extension direction of the fourth line segment; and the first included angle, the second included angle and the third included angle are all greater than 0° and are less than 180°.

11. The adjustable radio frequency unit according to claim 1, wherein each of the first tunable dielectric layer and the second tunable dielectric layer further comprises a connecting part located between the first substrate and the second substrate and configured to fixedly connect the tunable dielectric parts and the fixed dielectric parts.

12. The adjustable radio frequency unit according to claim 11, wherein a difference value of a dielectric constant of each of a material of the first substrate, a material of the second substrate and a material of the connecting part and a dielectric constant of a material of each of the fixed dielectric parts is less than or equal to a preset value.

13. A filter, wherein the filter comprises a plurality of adjustable radio frequency units according to claim 1, and the plurality of adjustable radio frequency units are arranged in an array.

14. The filter according to claim 13, wherein the second conductive layer of each of the adjustable radio frequency units is disconnected, and the third conductive layer of each of the adjustable radio frequency units is disconnected; and the tunable dielectric parts, located on the first tunable dielectric layers, in the plurality of adjustable radio frequency units communicate, and the tunable dielectric parts, located on the second tunable dielectric layers, in the plurality of adjustable radio frequency units communicate.

15. The filter according to claim 13, wherein the filter further comprises a driving unit electrically connected to the adjustable radio frequency units; and the driving unit is configured to be capable of driving each of the adjustable radio frequency units to independently work.

16. The filter according to claim 15, wherein the driving unit comprises a first driving subunit, a second driving subunit and a grounding wire;

the first driving subunit is located on the side, away from the first tunable dielectric layer, of the second conductive layer and is electrically connected to the second conductive layer; and the second driving subunit is located on the side, away from the second tunable dielectric layer, of the third conductive layer and is electrically connected to the third conductive layer, and the first conductive layer of each of the adjustable radio frequency units is electrically connected to the grounding wire.

17. An electronic device, comprising the filter according to claim 13.

* * * * *